United States Patent
Wesenberg et al.

(10) Patent No.: US 11,377,139 B2
(45) Date of Patent: Jul. 5, 2022

(54) METHOD FOR CONTROLLING A STEER-BY-WIRE STEERING SYSTEM IN A MOTOR VEHICLE AND STEER-BY-WIRE STEERING SYSTEM

(71) Applicant: AUDI AG, Ingolstadt (DE)

(72) Inventors: André Wesenberg, Pfaffenhofen (DE); Thorsten Groh, Neuburg an der Donau (DE)

(73) Assignee: AUDI AG, Ingolstadt (DE)

( * ) Notice: Subject to any disclaimer, the term of this patent is extended or adjusted under 35 U.S.C. 154(b) by 293 days.

(21) Appl. No.: 16/711,745

(22) Filed: Dec. 12, 2019

(65) Prior Publication Data
US 2020/0198688 A1 Jun. 25, 2020

(30) Foreign Application Priority Data
Dec. 20, 2018 (DE) .......................... 102018222442.0

(51) Int. Cl.
*B62D 5/04* (2006.01)
*G01L 5/22* (2006.01)
*B62D 1/04* (2006.01)

(52) U.S. Cl.
CPC .............. *B62D 5/046* (2013.01); *B62D 1/04* (2013.01); *B62D 5/0406* (2013.01);
(Continued)

(58) Field of Classification Search
CPC ........ B62D 5/046; B62D 1/04; B62D 5/0406; B62D 5/0427; B62D 5/0481; G01L 5/221
See application file for complete search history.

(56) References Cited

U.S. PATENT DOCUMENTS 11,180,207 B2 * 11/2021 Sardes .................. B62D 65/04
2002/0005315 A1 1/2002 Kind et al.
(Continued)

FOREIGN PATENT DOCUMENTS

DE 19838490 A1 12/1999
DE 19912169 A1 7/2000
(Continued)

OTHER PUBLICATIONS

German Search Report dated Aug. 5, 2019 in corresponding German Application No. 102018222442.0; 20 pages; Machine translation attached.
(Continued)

*Primary Examiner* — Peter D Nolan
*Assistant Examiner* — Wae L Louie
(74) *Attorney, Agent, or Firm* — Maier & Maier, PLLC

(57) ABSTRACT

A method for controlling a steer-by-wire steering system in a motor vehicle, wherein, by means of an operator element to be actuated by an operator, a control command for actuating a steering actuator acting on at least one wheel to be steered is output, and wherein, by means of a force application element acting on the operator element and in operative connection with the steering actuator, an actuation force for the operator element is set. In the case of a disturbance of the force application element, the steering actuator is actuated so that the control command applied by the operator element is transmitted only in a damped manner to the steering actuator.

20 Claims, 1 Drawing Sheet

(52) U.S. Cl.
    CPC ......... *B62D 5/0427* (2013.01); *B62D 5/0481* (2013.01); *G01L 5/221* (2013.01)

(56) References Cited

U.S. PATENT DOCUMENTS

| | | | |
|---|---|---|---|
| 2004/0193374 A1* | 9/2004 | Hac | G08G 1/166 |
| | | | 701/301 |
| 2013/0245888 A1* | 9/2013 | Kikuchi | B60G 17/06 |
| | | | 701/38 |
| 2019/0031230 A1* | 1/2019 | Kim | B62D 5/0472 |
| 2019/0084611 A1* | 3/2019 | Klein | B62D 5/0481 |
| 2019/0118855 A1* | 4/2019 | Yu | B62D 5/001 |
| 2020/0001922 A1* | 1/2020 | Yamamoto | B62D 15/025 |
| 2020/0102003 A1* | 4/2020 | Ishimura | B62D 6/008 |
| 2020/0130731 A1* | 4/2020 | Wesenberg | B60R 25/021 |
| 2020/0189607 A1* | 6/2020 | Wesenberg | F02D 41/22 |
| 2020/0198688 A1* | 6/2020 | Wesenberg | B62D 5/0406 |

FOREIGN PATENT DOCUMENTS

| | | |
|---|---|---|
| DE | 10302268 A1 | 7/2004 |
| DE | 10329278 A1 | 1/2005 |
| DE | 102016009684 A1 | 2/2018 |
| JP | 2004122827 A | 4/2004 |
| WO | 02/16181 A1 | 2/2002 |

OTHER PUBLICATIONS

Office Action dated Nov. 22, 2021, in connection with corresponding Chinese Application No. 201911299849.2 (13 pp., including machine-generated English translation).

\* cited by examiner

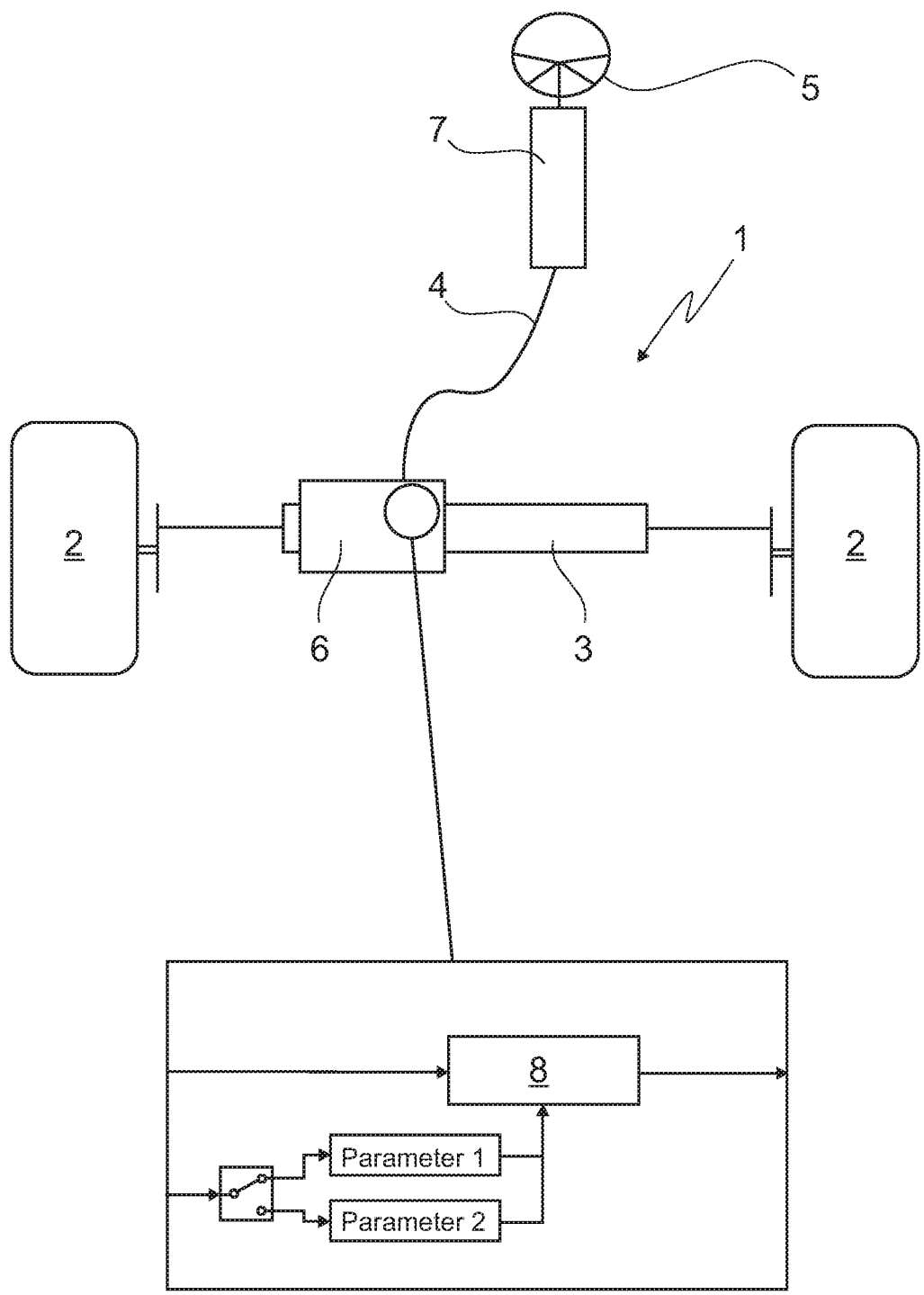

METHOD FOR CONTROLLING A STEER-BY-WIRE STEERING SYSTEM IN A MOTOR VEHICLE AND STEER-BY-WIRE STEERING SYSTEM

FIELD

The disclosure relates to a method for controlling a steer-by-wire steering system in a motor vehicle. Moreover, the invention relates to a steer-by-wire steering system.

BACKGROUND

Such a steer-by-wire steering system is disclosed in DE 199 12 169 A1. Here, a feedback actuator unit is provided, which, if the steering column is dispensed with, is intended to reproduce the feel of the road which is lost by dispensing with the steering column in such a steer-by-wire steering system.

A method for operating a control system in a motor vehicle, for example, in a by-wire brake system, is disclosed in WO 02/16181 A1.

As is known, in such a steer-by-wire steering system, there is no mechanical connection between the operator element and the steering actuator. In order to be able to set the actuation force on the operator element, a force application element, also referred to as manual force actuator, is used, which is connected via a communication network to the steering actuator. Via this communication network, for example, the total tie rod force acquired by the steering actuator is communicated to the force application element which then, in accordance with the tie rod force and other limiting conditions such as, for example, the steering wheel angle, the vehicle speed, etc., sets an actuation force on the operator element.

In the case of a disturbance of the force application element, this function can no longer be ensured, and a sudden decrease of the actuation forces on the operator element can occur. Thereby, it is possible that, due to the unfamiliar sensation on the operating element, the operator, that is to say the driver, sets a larger steering angle than actually desired. In the end, this can lead to the steering actuator reacting very rapidly to such a steering angle jump on the part of the operator element and to the vehicle not behaving in accordance with what the driver actually wants.

SUMMARY

In principle, this problem can be circumvented, for example, by means of mechanical friction elements within the operator element or the use of a redundant manual force actuator or force application element, which, however, leads to high additional costs.

Therefore, the aim of the invention is to create a method for controlling a steer-by-wire steering system which, with little effort, in the case of a disturbance of the force application element acting on the operator element, ensures that dangerous situations are avoided.

By the actuation of the steering actuator according to the invention, the control command applied by the operator element is transmitted only in a damped manner to the steering actuator, whereby a rapid reaction of the steering actuator to set point specifications from the operator element can be circumvented, and, in this manner, oversteering and thus wrenching around of the motor vehicle can be prevented. Due to the more sluggish reaction of the steering actuator to steering commands of the operator element, the method according to the invention enables a more reliable operation of the steering system, even in problematic situations, wherein, advantageously, no essential modification of the steering system itself is necessary, since all the measures can be taken using means that are already present in principle. In particular, additional hardware measures on the force application element can be avoided In a very advantageous development of the invention, it can be provided that, for damping the control command in a controlled system used for controlling the steering actuator, at least one filter coefficient is changed. Such a change of a filter coefficient represents a relatively simple measure which can be taken without problem.

The change of the filter coefficients can be carried out in a particularly simple manner, if, for changing the at least one filter coefficient, a changed parameter set in the controlled system is used.

Alternatively or additionally, it can be provided that, for changing the at least one filter coefficient, at least one changed functional group in the controlled system is used. In this manner, a corresponding filter coefficient can be changed and thus the control command for the steering actuator can be damped.

In the case of a disturbance of the force application element, in order to ensure as satisfactory a driving behavior of the motor vehicle as possible, with a manageable reaction of the motor vehicle at all times, it can moreover be provided that the damping of the control command applied by the operator element to the steering actuator is carried out as a function of a speed of the motor vehicle and/or of a control deviation of the steering actuator.

An alternative or additional solution in this context can consist in that the damping of the control command applied by the operator element to the steering actuator is carried out as a function of a control deviation of the steering actuator.

Alternatively or additionally, it can moreover be provided that the damping of the control command applied by the operator element to the steering actuator is carried out as a function of a position and/or of a speed and/or of an acceleration of a component of the steer-by-wire steering system.

According to an alternative or additional solution, it can be provided that the damping of the control command applied by the operator element to the steering actuator is carried out as a function of the level of a total tie rod force. In this manner, in the case of a disturbance of the force application element, an acceptable driving behavior of the motor vehicle can be ensured, with a manageable reaction of said vehicle at all times.

An additional advantageous design of the invention can consist in that the disturbance of the force application element is determined by means of a voltage measurement of the force application element. This enables a simple error detection and thus a reliable performance of the method according to the invention.

BRIEF DESCRIPTION OF THE DRAWINGS

Below, an embodiment example of the invention is schematically represented using the drawing.

In the drawing:

FIG. 1 shows an inventive steer-by-wire steering system with which the method according to the invention can be carried out.

DETAILED DESCRIPTION

FIG. 1 shows a steer-by-wire steering system 1 in a vehicle which is not represented in its entirety. The steerby-wire steering system 1 comprises a steering actuator 3 acting on wheels 2 to be steered, which, via a communication network 4, is in operative connection with an operator element 5 which, in the present case, is implemented in the form of a steering wheel.

For controlling the steering actuator 3, a control device 6 in operative connection with said steering actuator is used, in which, in a manner which in itself is known, different software functions are integrated, which will be discussed in greater detail. By means of the operator element 5, it is possible to output a control command or steering command for actuating the steering actuator 3. Here, an actuation force for the operator element 5 is set by means of a force application element 7 which acts on the operator element 5 and is in operative connection with the steering actuator 3 via the communication network 4, element which can also be referred to as manual force actuator and which can be designed, for example, as an electric motor. In this manner, the operator or the driver, in spite of the absence of mechanical connection between the operator element 5 and the steering actuator 3, receives feedback on the driving situation of the motor vehicle, so that a driving feel is set which is similar to the driving feel in steering systems in which there is a mechanical connection between the operator element 5 and the steering actuator 3.

In the case of a disturbance of the force application element 7, in order to be able to prevent erroneous operations on the part of the operator, it is provided, in a method for controlling the steer-by-wire steering system 1, that the steering actuator 3 is actuated so that the control command applied by the operator element 5 is transmitted only in a damped manner to the steering actuator 3. As a result, the motor vehicle reacts to individual inputs on the part of the operator on the operator element 5 in a more sluggish manner than in normal operation, whereby an oversteering and thus a wrenching around of the steering can be prevented. The motor vehicle, in particular for large steering angle changes, nevertheless continues to remain sufficiently dynamic and thus safely manageable for the operator. When no disturbance is detected, the steer-by-wire steering system 1 can be operated in the usual manner known from the prior art.

The disturbance of the force application element 7 can be determined, for example, by means of a voltage measurement of the force application element 7. However, for this purpose, other methods that are known in themselves can also be used. Moreover, it is possible to indicate the disturbance of the force application element 7 acoustically and/or optically, for example, in a corresponding display field within an instrument support which is not represented.

For damping the control command, in a controlled system 8 which is used for controlling the steering actuator 3 and contained in a software function of the control device 6, at least one filter coefficient can be changed. For example, this is possible in that a changed parameter set is used in the controlled system 8. However, alternatively, in the controlled system 8, a changed functional group can also be used. Moreover, it is possible to use a higher time constant, for example, a time/distance integral.

The damping of the control command applied by the operator element 5 to the steering actuator 3 can in addition be carried out as a function of a speed of the motor vehicle, as a function of a control deviation of the steering actuator 3, as a function of a position and/or of a speed and/or of an acceleration of a component of the steer-by-wire steering system and/or as a function of the level of a total tie rod force. Additional possible dependencies, which are already partially contained in the above-mentioned dependencies, are a steering wheel angle, a steering wheel angular speed, a steering wheel angular acceleration, steering rack position, a steering rack shifting speed, a steering rack acceleration, a rotation speed of an electric motor of the steering actuator 3, an acceleration of an electric motor of the steering actuator 3, a torque of an electric motor of the steering actuator 3, a change of the torque of an electric motor of the steering actuator 3 (for example, versus time, rotation speed, stroke, angle), a wheel steering angle, a wheel steering angular speed, an acceleration or deceleration of the motor vehicle, a current consumption of the steering actuator 3, a change of the current consumption of the steering actuator 3 (for example, versus time, rotation speed, stroke, angle), a change of the total tie rod force (for example, versus time, rotation speed, stroke, angle).

In a manner not represented, between the force application element 7 and the steering actuator 3, an additional control device can be connected, so that the steering actuator 3 is not directly in connection with the force application element 7 and the described damping becomes operative or is carried out in such an interconnected control device. The described method for controlling the steer-by-wire steering system 1 as well as the steer-by-wire steering system 1 itself can also be implemented in this manner.

The invention claimed is:

1. A method for controlling a steer-by-wire steering system in a motor vehicle, comprising:
   an operator element is to be actuated by an operator, a control command for actuating a steering actuator acting on at least one wheel to be steered is output, and wherein, by a force application element acting on the operator element and in operative connection with the steering actuator, an actuation force for the operator element is set,
   wherein upon detection of a disturbance of the force application element, the steering actuator is actuated so that the control command applied by the operator element is transmitted only in a damped manner to the steering actuator such that a force applied to the steering actuator from the operator element is reduced.

2. The method according to claim 1, wherein for damping the control command, in a controlled system used for controlling the steering actuator, at least one filter coefficient is changed.

3. The method according to claim 2, wherein for changing the at least one filter coefficient, a changed parameter set in the controlled system is used.

4. The method according to claim 3, wherein for changing the at least one filter coefficient, at least one changed functional group in the controlled system is used.

5. The method according to claim 3, wherein the damping of the control command applied by the operator element to the steering actuator is carried out as a function of a speed of the motor vehicle.

6. The method according to claim 3, wherein the damping of the control command applied by the operator element to the steering actuator is carried out as a function of a control deviation of the steering actuator.

7. The method according to claim 3, wherein the damping of the control command applied by the operator element to the steering actuator is carried out as a function of a position and/or of a speed and/or of an acceleration of a component of the steer-by-wire steering system.

8. The method according to claim 2, wherein for changing the at least one filter coefficient, at least one changed functional group in the controlled system is used.

9. The method according to claim 8, wherein the damping of the control command applied by the operator element to the steering actuator is carried out as a function of a speed of the motor vehicle.

10. The method according to claim 8, wherein the damping of the control command applied by the operator element to the steering actuator is carried out as a function of a control deviation of the steering actuator.

11. The method according to claim 2, wherein the damping of the control command applied by the operator element to the steering actuator is carried out as a function of a speed of the motor vehicle.

12. The method according to claim 2, wherein the damping of the control command applied by the operator element to the steering actuator is carried out as a function of a control deviation of the steering actuator.

13. The method according to claim 2, wherein the damping of the control command applied by the operator element to the steering actuator is carried out as a function of a position and/or of a speed and/or of an acceleration of a component of the steer-by-wire steering system.

14. The method according to claim 1, wherein the damping of the control command applied by the operator element to the steering actuator is carried out as a function of a speed of the motor vehicle.

15. The method according to claim 14, wherein the damping of the control command applied by the operator element to the steering actuator is carried out as a function of a control deviation of the steering actuator.

16. The method according to claim 1, wherein the damping of the control command applied by the operator element to the steering actuator is carried out as a function of a control deviation of the steering actuator.

17. The method according to claim 1, wherein the damping of the control command applied by the operator element to the steering actuator is carried out as a function of a position and/or of a speed and/or of an acceleration of a component of the steer-by-wire steering system.

18. The method according to claim 1, wherein the damping of the control command applied by the operator element to the steering actuator is carried out as a function of the level of a total tie rod force.

19. The method according to claim 1, wherein the disturbance of the force application element is determined by means of a voltage measurement of the force application element.

20. A steer-by-wire steering system in a motor vehicle, comprising:
a steering actuator acting on at least one wheel to be steered, with an operator element to be actuated by an operator for the output of a control command for controlling the steering actuator, and with a force application element acting on the operator element and in operative connection with the steering actuator, for the setting of an actuation force for the operator element,
wherein in the case of a disturbance of the force application element, the steering actuator can be actuated so that the control command applied by the operator element is transmitted only in a damped manner to the steering actuator.

* * * * *